US006193805B1

(12) United States Patent
Cargill

(10) Patent No.: US 6,193,805 B1
(45) Date of Patent: Feb. 27, 2001

(54) DIFFUSER

(76) Inventor: James Moir Cargill, 9 Lyngarth Park Lyngarth Roadm Kloof 3610, Kwa Zulu Natal (ZA)

( * ) Notice: Subject to any disclaimer, the term of this patent is extended or adjusted under 35 U.S.C. 154(b) by 0 days.

(21) Appl. No.: 09/243,819

(22) Filed: Feb. 3, 1999

(30) Foreign Application Priority Data

Feb. 11, 1998 (ZA) .................................................... 98/1102

(51) Int. Cl.[7] .............................. C13D 1/00; B01D 11/00

(52) U.S. Cl. .............................. 127/5; 422/267; 422/268; 422/269; 422/273; 422/281

(58) Field of Search ................................ 127/5; 422/267, 422/268, 269, 273, 281

(56) References Cited

U.S. PATENT DOCUMENTS 3,533,837 * 10/1970 Strich ...................................... 127/5
4,182,632 * 1/1980 Cargill .................................... 127/5
4,956,125 * 9/1990 Kawamata et al. ............... 260/412.8

* cited by examiner

*Primary Examiner*—David Brunsman
(74) *Attorney, Agent, or Firm*—Young & Thompson

(57) ABSTRACT

A diffusion apparatus for extraction of sugar from sugar cane has a vertically-diposed annular extracting compartment including a revolving screen deck contained within a fixed inner shell and a fixed outer shell. The revolving screen is supported on rollers and driven by any suitable elements. The comminuted sugar cane is fed into the compartment and extracting liquid is moved countercurrent and exits through an outlet.

7 Claims, 5 Drawing Sheets

SECTIONAL PLAN OF DIFFUSER D - D

SECTIONAL ELEVATION A - A THROUGH DIFFUSER

SECTIONAL PLAN OF DIFFUSER D - D

PROCESS FLOW DIAGRAM IN DIFFUSER

JUCE SPRAY CONTROL SYSTEM

DIFFUSER

FIELD OF THE INVENTION

Although this specification makes particular reference to the extraction of sucrose from sugar cane, it must be understood that the invention also covers the extraction of any suitable soluble substances from any type of sub-divided solids containing such substances.

The extraction of sucrose from sugar cane generally comprises two major stages: firstly, a particle size reduction stage, during which the cane is prepared to a certain fineness; and secondly, the crushing and/or the diffusion, or lixiviating, stage. In this latter stage, the prepared cane or bagasse is conveyed and by percolation and/or countercurrent flowing of a suitable water mixture, the residual sucrose is dissolved and extracted. The present invention is directed to the second stage.

BACKGROUND OF THE INVENTION

Various apparatus and methods are known to effect the diffusion stages.

It is an object of the invention to provide an apparatus for solvent extraction by means of which the movement of the prepared cane or bagasse is relatively simplified.

SUMMARY OF THE INVENTION

According to the invention there is provided a diffusion apparatus comprising a vertically-disposed annular extracting compartment, a means of feeding the compartment with the material being processed, a means to move the material around and within this compartment, and a means of removing the material from the compartment.

The extraction stage may comprise a revolving screen deck contained within a fixed inner column, or shell, and a fixed outer column, or shell. The revolving screen is supported on rollers and is caused to revolve by suitable drives, such as hydraulic motors or rams, or by electrical geardrives. More than one drive mechanism may be employed.

The material being processed rests on the screen deck and is transported from the feed inlet of the annular compartment to the discharge outlet of the compartment as the screen deck revolves.

The material is fed into the annular compartment by means of a distributing conveyor and is removed at the discharge outlet by means of discharge screws, or other means of discharging the material, such as discharge chain conveyors, or a suitably shaped discharge plate. The discharge mechanism feeds the material into a discharge chute in the outer fixed column, or shell.

In a preferred form of the invention the outer and inner shells of the apparatus are fixed. Within the two shells is a rotating screen deck supported over several fixed trays. During the passage of the material to be processed from the inlet to the discharge stages the material is subjected to a countercurrent spraying of a solvent, the solute being collected in the trays beneath the screen deck and pumped in a countercurrent fashion from the discharge stage where the solute is least concentrated to the inlet stage where the solute is most highly concentrated. The solute is then sent for further processing and the material is discharged for final solvent removal. In the case where the material prepared is cane the solute can be water or cane sugar juice of varying sugar concentration.

BRIEF DESCRIPTION OF THE DRAWINGS

The invention will now be described by way of example with reference to the accompanying diagrammatic drawings of which.

DETAILED DESCRIPTION OF THE INVENTION

Figure 1:
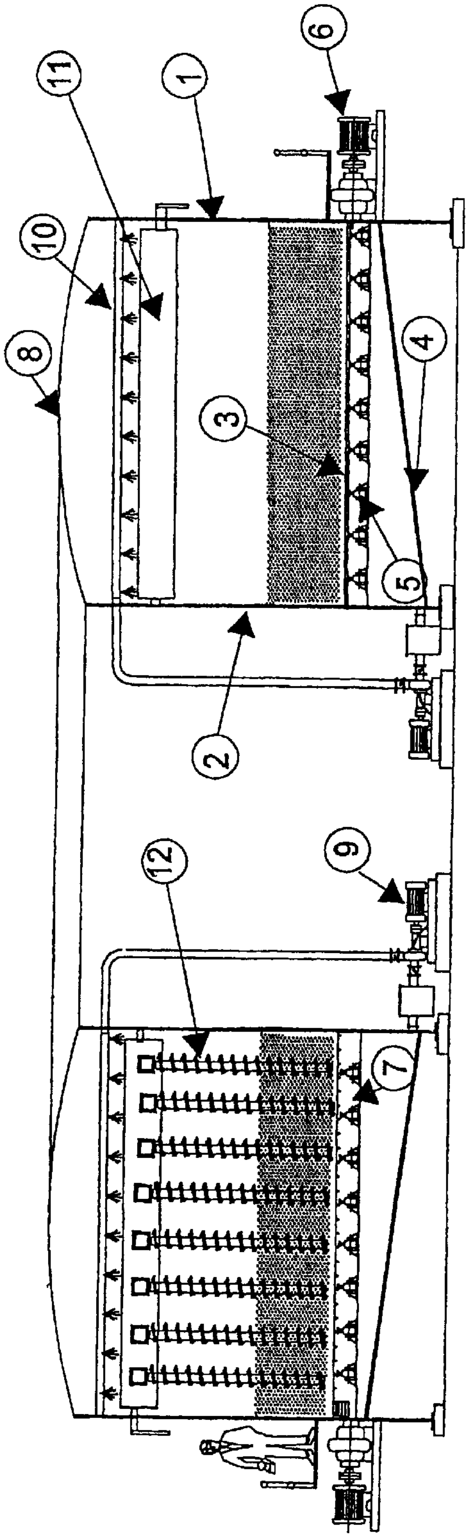
FIG. 1 shows a sectional elevation A—A through the diffuser.

Referring to FIG. 1, the diffuser consists of an outer fixed cylindrical shell, 1, an inner fixed cylindrical shell, 2. and a rotating screen deck, 3, supported over several fixed juice trays, 4, by means of rollers, 5. The rotating screen deck is rotated by means of one or more electrical or hydraulic geared motors, 6, or by stepless hydraulic cylinders. (Not shown)

The fixed outer column or shell, 1, and the fixed inner column, 2, are joined together at the base by the fixed juice collection trays, 4, and support beams, 7, and at the top by a fixed roof structure, 8.

Juice collected in the trays, 4, is pumped countercurrent to the flow of the material by pumps, 9, and sprayed on to the upstream material through sprays, 10. The spray area can be adjusted by means of spray directing flaps, 11. Vertical bed disturbance screws, 12, are placed in areas of the bed that require reforming to avoid bed clogging, or blinding.

Figure 2:
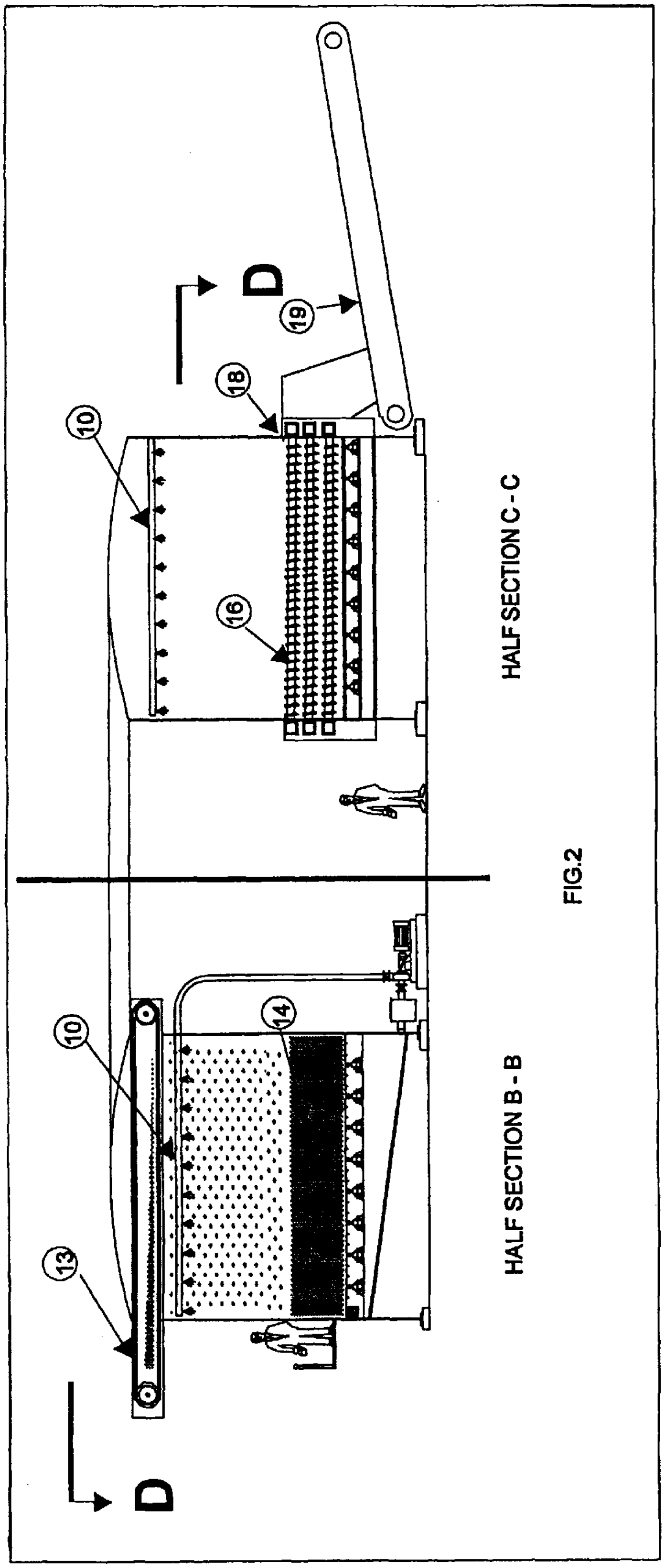
FIG. 2 shows two half sectional elevations through the diffuser.

Referring to FIG. 2, the prepared material is fed onto the slowly rotating screen by means of a feed conveyor, 13, and the material forms a bed, 14. The bed is saturated with solute by means of sprays, 10. which are situated over the bed at fixed positions to provide a counter-current flow of solute relative to the flow of the material. The slowly rotating deck carries the bed of material from the inlet at conveyor, 13. to the material discharge opening, 18. The material is removed from the rotating deck by horizontal discharge screws, 16, and fed to a discharge conveyor, 19.

Figure 3:
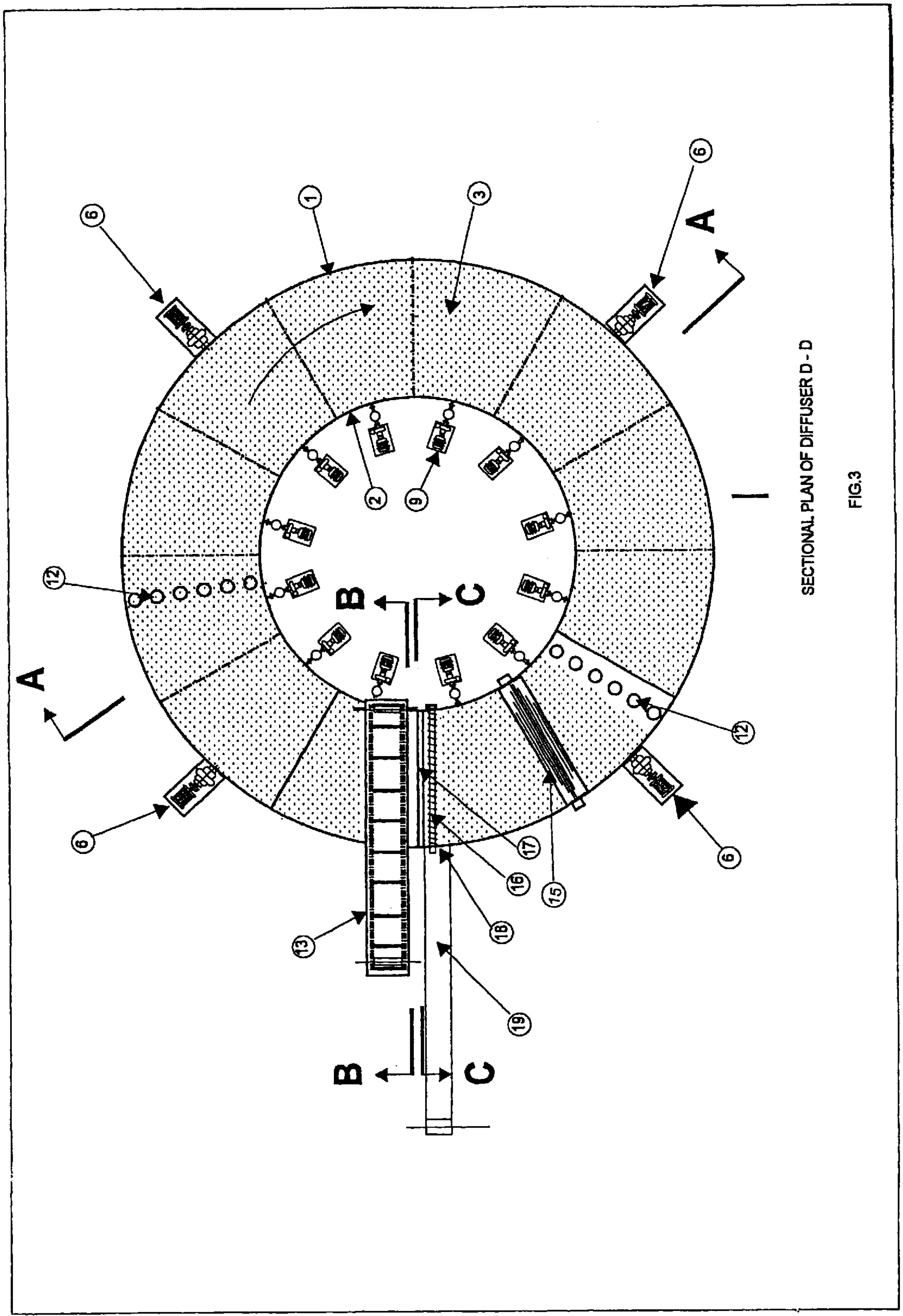
FIG. 3 shows a sectional plan of the diffuser.

Referring to FIG. 3, this a sectional plan D—D of the diffuser showing the fixed outer shell, 1, the fixed inner shell, 2; the rotating screen deck, 3; juice pumps, 9; bed disturbance screws, 12; material feed conveyor, 13; dewatering roll, 15; discharge screws, 16; fixed inner wall, 17; discharge opening, 18; and a material discharge conveyor, 19. Material, prepared cane, enters the diffuser from openings in the bottom of the material feed conveyor, 13, and falls to the rotating deck, 3, to form a bed of material. The rotating deck is driven by two or more electrical or hydraulic drives, 6. The material, prepared cane, Is transported from the feed end of the diffuser In one revolution to the discharge opening, 18, during which it is sprayed by recirculating juice from pumps, 9. For clarity the sprays are not shown in FIG. 3. The bed is disturbed by disturbance screws, 12, at predetermined positions. A dewatering roll, 15, is placed before the discharge opening, 18, to prevent flooded material from leaving the diffuser in an uncontrolled manner. A fixed inner wall, 17, separates the feed inlet of the diffuser from the discharge end.

Figure 4:
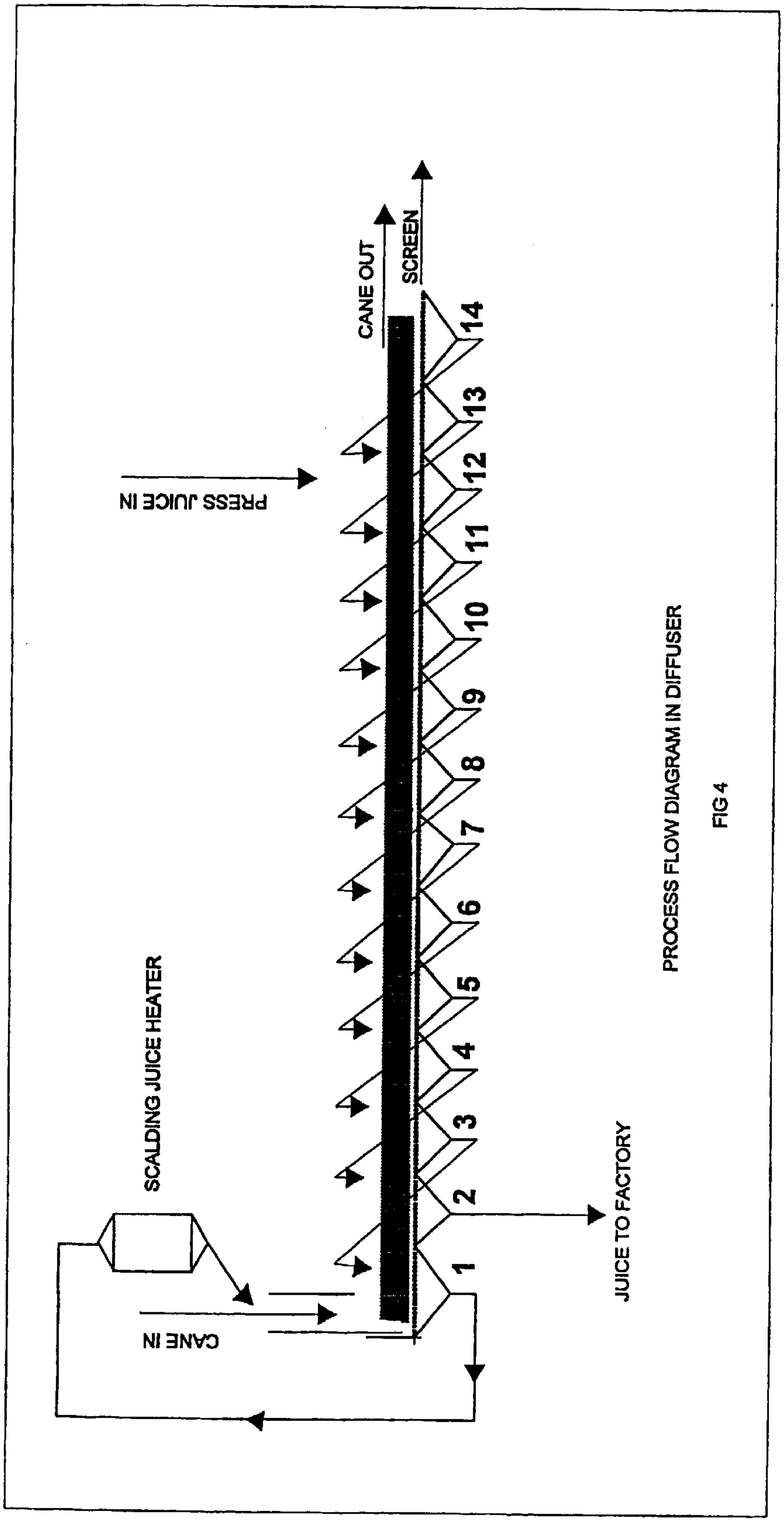
FIG. 4 is process flow diagram of the diffuser.
Figure 5:
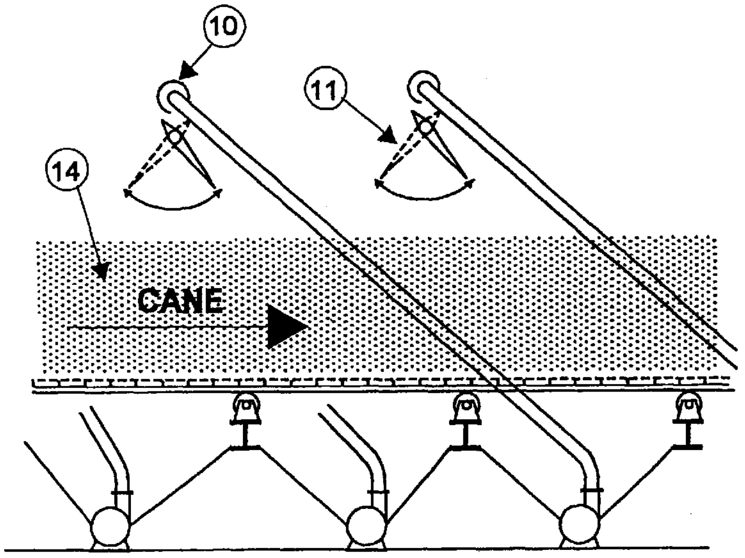
FIG. 5 is diagram showing the control of the juice sprays in the diffuser.

FIG. 4 represents the process flow diagram of a cane diffuser. Prepared cane is fed into the feed area of the diffuser and saturated with scalding juice to raise the temperature and start the diffusion process. The bed formed on the moving screen deck is sprayed with juice, which percolates down through the screen deck into fixed trays underneath from where it is pumped in a countercurrent manner back on to the bed. Press juice, or hot water or both, is applied near the discharge area of the diffuser and surplus juice is discharged for further processing near the feed end of the diffuser where the juice has the highest concentration of sucrose due to the countercurrent flow of the process. The points at which juice is extracted from a juice tray compartment and pumped counter-current to the flow of bagasse is illustrative only and can be varied according to the permeability of the bagasse mat and amount of stage recirculation required, FIG. 5 shows a vertical cross-section through a typical stage, indicating the means whereby juice is pumped from a juice tray under the fixed screen deck and sprayed onto the moving bagasse mat in a counter-flow fashion. The sprayed juice percolates down through the bagasse mat, through the screen and into the juice trays to be pumped again in a counter-current manner. The porosity of bagasse mat affects the time taken for the juice to percolate down through the moving bagasse mat and thus the point of exit of the juice through the screen deck into the trays. It may be preferable to have some means of adjusting the point of application of the juice sprays, 10, so that the desired exit point of the juice from the bagasse mat is controlled, and this is obtained by varying the position of the spray directing flaps, 11.

The advantages of the invention are seen to be as follows:

1. Construction is mainly simple platework and relatively inexpensive.
2. There are no chains, or expensive chain driving systems necessary to transport the cane within the diffuser.
3. The rotating screen deck rests on rollers and does not require heavy torques to be applied to headshafts, tailshafts, or chains, as in conventional longitudinal diffusers in present use, to cause the deck to move.
4. The rotational torque is applied at the outside diameter of the deck at a point of maximum leverage thereby reducing the force required. The rotation may be applied by synchronised electric or hydraulic motors, or by synchronised hydraulic rams to obtain a steplessly variable rotational speed inexpensively.
5. No heavy chains or scrapers rest on the screens thereby reducing the torque required for rotation and reducing the wear to stationary members caused by chain transporting systems.
6. It is suitable for outdoor operation and is totally enclosed.
7. There is only one major moving part in the diffuser, apart from pumps, and that is the slowly rotating screen deck.

What is claimed is:

1. A diffusion apparatus, comprising:

an outer cylindrical shell, an inner cylindrical shell, and an annular extraction compartment vertically disposed therebetween;

a horizontal monolithic screen located in the annular compartment, said monolithic screen being structured and arranged to rotate between the inner and outer shells;

a fixed liquid collection means positioned below the screen;

an inlet for material to be extracted;

an outlet including means for continuously discharging extracted material;

means for circulating extracting liquid from the fixed collection means to fixed positions above the screen; and outlet means for a solute.

2. The diffusion apparatus according to claim 1, further comprising means for applying rotational torque at the outside diameter of the screen.

3. The diffusion apparatus according to claim 1, wherein the screen rests on rollers.

4. The diffusion apparatus according to claim 1, wherein the extraction takes place within one revolution of the screen.

5. The diffusion apparatus according to claim 1, wherein the fixed collection means comprise trays with connecting pumps and pipes to sprays located above the screen.

6. The diffusion apparatus according to claim 1, wherein the material to be extracted is introduced by a conveyor, and the extracted material is removed from the outlet by discharge screws or chain conveyors.

7. The diffusion apparatus according to claim 1, wherein the material to be extracted is prepared sugar cane and the extracting liquid comprises water.

* * * * *